(12) United States Patent
Hauschild et al.

(10) Patent No.: US 9,555,708 B2
(45) Date of Patent: Jan. 31, 2017

(54) METHOD FOR CONTROLLING THE DISPLAY OF INFORMATION ON A DISPLAY AREA

(75) Inventors: Frank Hauschild, Berlin (DE); Mathias Kuhn, Berlin (DE); Rainer Dehmann, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 807 days.

(21) Appl. No.: 13/285,813

(22) Filed: Oct. 31, 2011

(65) Prior Publication Data

US 2012/0075335 A1    Mar. 29, 2012

Related U.S. Application Data

(63) Continuation of application No. PCT/EP2010/055751, filed on Apr. 28, 2010.

(30) Foreign Application Priority Data

Apr. 30, 2009   (DE) .......................... 10 2009 019 562

(51) Int. Cl.
*B60K 35/00*    (2006.01)
*B60K 37/06*    (2006.01)
*G06F 3/0482*   (2013.01)

(52) U.S. Cl.
CPC ............... *B60K 35/00* (2013.01); *B60K 37/06* (2013.01); *G06F 3/0482* (2013.01); *B60K 2350/1004* (2013.01); *B60K 2350/1024* (2013.01)

(58) Field of Classification Search
USPC ........................................................ 345/619
See application file for complete search history.

(56) References Cited

U.S. PATENT DOCUMENTS

| 7,055,106 B2* | 5/2006 | Shibata .......................... 715/837 |
| 7,191,411 B2* | 3/2007 | Moehrle ........................ 715/855 |
| 7,587,679 B1* | 9/2009 | Sundermeyer et al. ....... 715/777 |
| 7,589,750 B1* | 9/2009 | Stratton ......................... 345/677 |
| 8,108,795 B2* | 1/2012 | Urrabazo et al. ............. 715/810 |
| 2001/0004260 A1* | 6/2001 | Bauer et al. ................... 345/418 |
| 2001/0043238 A1* | 11/2001 | Guerrero ....................... 345/853 |

(Continued)

FOREIGN PATENT DOCUMENTS

| DE | 199 41 956 | 3/2001 |
| DE | 103 60 660 | 7/2005 |

(Continued)

OTHER PUBLICATIONS

"The Windows File Manager in Windows NT 3.5," wikipedia.

(Continued)

*Primary Examiner* — James A Thompson
(74) *Attorney, Agent, or Firm* — Andrews Kurth Kenyon LLP

(57) ABSTRACT

In a method for controlling the display of information on a display area, the information is structured hierarchically in objects, in which an object and a path, which leads to the object in the hierarchical structure, are displayed. The path is divided into individual path elements, the path elements belonging to different hierarchy levels of the path leading to the object, and the path elements being selectable buttons, and the information display jumping to the hierarchy level of the selected path element when a path element is selected.

9 Claims, 5 Drawing Sheets

(56) References Cited

U.S. PATENT DOCUMENTS

| | | | |
|---|---|---|---|
| 2003/0052924 A1* | 3/2003 | Carlson et al. | 345/810 |
| 2004/0128275 A1* | 7/2004 | Moehrle | 707/1 |
| 2005/0187889 A1* | 8/2005 | Yasoshima | 707/1 |
| 2006/0031893 A1* | 2/2006 | Fang et al. | 725/100 |
| 2006/0036568 A1* | 2/2006 | Moore et al. | 707/1 |
| 2006/0184892 A1* | 8/2006 | Morris | 715/767 |
| 2006/0242164 A1* | 10/2006 | Evans et al. | 707/100 |
| 2006/0265403 A1* | 11/2006 | Mercer et al. | 707/10 |
| 2006/0265588 A1* | 11/2006 | Lim et al. | 713/166 |
| 2007/0271530 A1* | 11/2007 | Klos et al. | 715/825 |
| 2007/0274180 A1* | 11/2007 | Kato et al. | 369/47.16 |
| 2008/0168340 A1* | 7/2008 | Jang | 715/206 |
| 2008/0215189 A1 | 9/2008 | Baumann et al. | |

FOREIGN PATENT DOCUMENTS

| | | |
|---|---|---|
| DE | 10 2006 023 226 | 11/2007 |
| DE | 10 2006 032 118 | 1/2008 |
| DE | 10 2006 049 182 | 4/2008 |
| WO | WO 98/47063 | 10/1998 |
| WO | WO 2008/134657 | 11/2008 |

OTHER PUBLICATIONS

International Search Report, dated Sep. 17, 2010, issued in corresponding International Appln. No. PCT/EP2010/055751.
Written Opinion, issued in corresponding International Appln. No. PCT/EP2010/055751.
International Preliminary Report on Patentability, issued in corresponding International Appln. No. PCT/EP2010/0055751.
German Search Report, issued in corresponding German Patent Appln. No. 10 2009 019 562.9.

* cited by examiner

METHOD FOR CONTROLLING THE DISPLAY OF INFORMATION ON A DISPLAY AREA

CROSS-REFERENCE TO RELATED APPLICATIONS

The present application is a continuation of PCT International Patent Application No. PCT/EP2010/055751, filed on Apr. 28, 2010, and claims priority to Application No. 10 2009 019 562.9, filed in the Federal Republic of Germany on Apr. 30, 2009, each of which is expressly incorporated herein in its entirety by reference thereto.

FIELD OF THE INVENTION

The present invention relates to a method for controlling the display of information on a display area, the information being structured hierarchically in objects. According to the method, an object and a path, which leads to the object in the hierarchical structure, are displayed. The method relates in particular to the control of the display of information on a display area that is situated in a vehicle. The display of information may furthermore support an operating device for devices of a vehicle.

BACKGROUND INFORMATION

Conventionally, various items of information are displayed in a vehicle, which visually illustrate for the driver in particular the operational data of the vehicle. Furthermore, traffic-related data may be displayed for the driver in the vehicle. In the past, analog mechanical display instruments were used to display this information. These were arranged in particular within the so-called instrument cluster in the vicinity of the driver's primary field of view behind the steering wheel. The instrument cluster is used in particular to indicate the speed, the fuel level, the radiator temperature and other operational information of the vehicle.

With the increase of electronic devices in the vehicle it has become necessary to display a greater quantity of information in the vehicle. Modern vehicles comprise for example a plurality of driver assistance systems, the information of which must be displayed in the vehicle. Furthermore, vehicles often include a navigation system. Such a navigation system is able to display digital geographic road maps including a route and possibly various additional information. Finally, modern vehicles often include communication and multimedia applications, including a mobile telephone interface and devices for playing back music and voice. For these applications it must also be possible to display information in the vehicle.

In order to be able to display the manifold information in a flexible manner, freely programmable displays are used for example, which often also take over the display of traditional mechanical instruments. German Published Patent Application No. 10 2006 032 118 describes an instrument cluster for a motor vehicle for example, which includes a display that is able to indicate variably the speed of the motor vehicle, the rotational speed of the engine of the motor vehicle, the temperature of the engine of the motor vehicle, the fuel level and/or the time. Furthermore, it is possible to display information of a navigation system, a telephone, a music system, an infotainment system and/or an air conditioning system.

In addition to the instrument cluster, a display device is often situated above the center console of the vehicle, via which additional information may be displayed. This display device is used in particular as a multifunction display and for representing a geographic map of a navigation system. Such a multifunction display is described, for example, in German Published Patent Application No. 199 41 956.

The display of information in a vehicle and the operation of the manifold devices of the vehicle entail very specific requirements. In the vehicle, it is, among others, the driver who takes in the information and operates the respective device. The information should thus be represented in the vehicle such that while taking in the information the driver is not distracted from driving. The driver should therefore be able to grasp the represented information intuitively and quickly such that he has to take his eyes off the driving action only very briefly when taking in the information. Likewise, the operation of the vehicle devices should be as simple and intuitive as possible such that the driver is able to operate the devices even while driving. If the operation is supported or guided by a display, then the display should occur in such a way that the driver has to view the display only very briefly in order to carry out the operation.

It is conventional to structure the information to be displayed hierarchically in objects so that the user is able quickly and intuitively to display specific desired information or to control the execution of specific functions quickly and intuitively. For this purpose, the objects may be divided into a plurality of menus. These menus are in turn structured hierarchically such that when selecting an object of a hierarchy level one reaches the next lower hierarchy level. In order to return to a higher hierarchy level, a so-called return button is often provided. It is furthermore known to display the entire hierarchical structure in the form of a tree diagram, which a user is able to navigate.

SUMMARY

Example embodiments of the present invention provide a method of the type mentioned at the outset, which assists the user in accessing information more quickly and simply, and by which the operation of devices supported by the information display is simplified.

The method according to example embodiments of the present invention is characterized by the fact that the path is divided into individual path elements, the path elements belonging to different hierarchy levels of the path leading to the object, and the path elements being selectable buttons. When selecting a path element, the information display jumps to the hierarchy level of the selected path element.

A button in the present context includes a control element of a graphical user interface. A button differs from elements and areas for the pure display of information, so-called display elements or display areas, in that they are selectable. When selecting a button, an associated function is executed. The function may result merely in a modification of the information display. Furthermore, the buttons may also be used to control devices whose operation is supported by the information display. The buttons may therefore replace traditional mechanical switches. The buttons can be generated and displayed arbitrarily on a freely programmable display area. Moreover, there may be a provision for marking a button. In this case, the associated function is not yet executed. The marked button, however, is highlighted with respect to other buttons. The marking and/or selection of a button may occur by cursor control or by directly operating a touch-sensitive display area.

A hierarchical structure in the present context should be understood to include a division of the displayable information into objects, which in turn are associated with different hierarchy levels. By selecting an object, the user reaches the next lower hierarchy level. One is thus able to arrive at an object by a successive selection of objects of higher hierarchy levels. The successive selection of objects in the present context is called a path. In this case, a hierarchy level thus refers to the point at which a higher-order object was selected on the path. It is also possible to arrive at an object via different paths. It is therefore possible for an object to be associated with different hierarchy levels.

The objects are structured in particular by categories. One object may be associated with different categories and subcategories. It is thus possible to reach an object by selecting categories and subcategories possibly across multiple hierarchy levels.

The objects may be associated with persons for example, about whom specific information such as telephone numbers and addresses are stored. In this case, the information display may support a navigation system or a telephone interface, in which the telephone number of a specific person is dialed or the address of a specific person may be taken over into the guidance of the navigation system. In this case, the persons may be divided by the user into different categories and subcategories. This categorization allows the user to navigate quickly and simply to the display of information about specific persons.

Furthermore, the objects may be associated with audio data that are structured hierarchically in a database in a manner known per se. For example, the user may access a musical piece via a musical genre, a specific interpreter and/or a specific album of an interpreter.

The display of the path that leads to a displayed object according to the method described herein makes it easier for the user to find orientation within the hierarchical structure. The division of the path into individual path elements that are provided as selectable buttons allows the user to navigate very quickly to higher hierarchy levels. In the process, the user is not limited to the simple return to a next higher hierarchy level. Rather, the user may return to any hierarchy level of the path. Furthermore, it is not necessary to represent the entire hierarchical structure. Such a representation would require a very large display area. This is especially disadvantageous when the display area is relatively small.

According to example embodiments of the method, following a selection of an object, at least a subset of the objects of the next lower hierarchy level is displayed. The displayed subset is associated with the selected object. Furthermore, a path element is added to the displayed path, which is associated with the hierarchy level of the selected object. The number of displayed path elements that are displayed for a displayed object may depend for example on the number of steps via which one has arrived at the object. To this end, in particular only those steps are taken into account that lead to a lower hierarchy level. The path indicated in the method described herein thus represents the history that has led to the displayed object. Depending on how the objects are hierarchically structured, it is possible to arrive at an object via different paths. In this case, the displayed path is the path via which the user actually arrived at the object. If an object is associated with only one specific hierarchy level, then the number of displayed path elements depends on the depth of the hierarchy level of the displayed object.

Following the selection of a path element, at least one subset of the objects on the hierarchy level may be displayed, which is associated with the selected path element. If an object is part of a menu, then, following the selection of the path element, one returns to the menu that contains the object with which the selected path element is associated.

A subset of objects of an xth hierarchy level may be displayed. Subsequently, a first object of the xth hierarchy level is selected. This object may be part of a menu for example. Thereupon at least a subset of the object of the next lower (x+1)th hierarchy level is displayed, the displayed objects being associated with the selected first object. The objects of the (x+1)th hierarchy level may belong to a submenu of the menu of the first object for example. Furthermore, an nth path element is added to the displayed path, which is associated with the xth hierarchy level. Optionally, navigations may subsequently be performed on even lower hierarchy levels. If in a step the nth path element is selected, then the subset with objects of the xth hierarchy level is displayed, the first, previously selected object being displayed as marked. If the user thus returns to a higher hierarchy level with the aid of the path elements, then the object is displayed as marked, the selection of which previously resulted in the nth path element being added. This marking makes it even easier for the user to find orientation in the hierarchical structure and to remember previous selection processes.

The individual path elements may be displayed side-by-side on a bar. This bar may also be called a status bar. It indicates how the user navigated to the displayed object and how the displayed object is situated within the hierarchical structure.

Preferably, graphical symbols are respectively displayed in the path elements for visualizing the hierarchy level of the path element.

Example embodiments of the present invention are described in more detail below with reference to the appended Figures.

DETAILED DESCRIPTION

Figure 1:
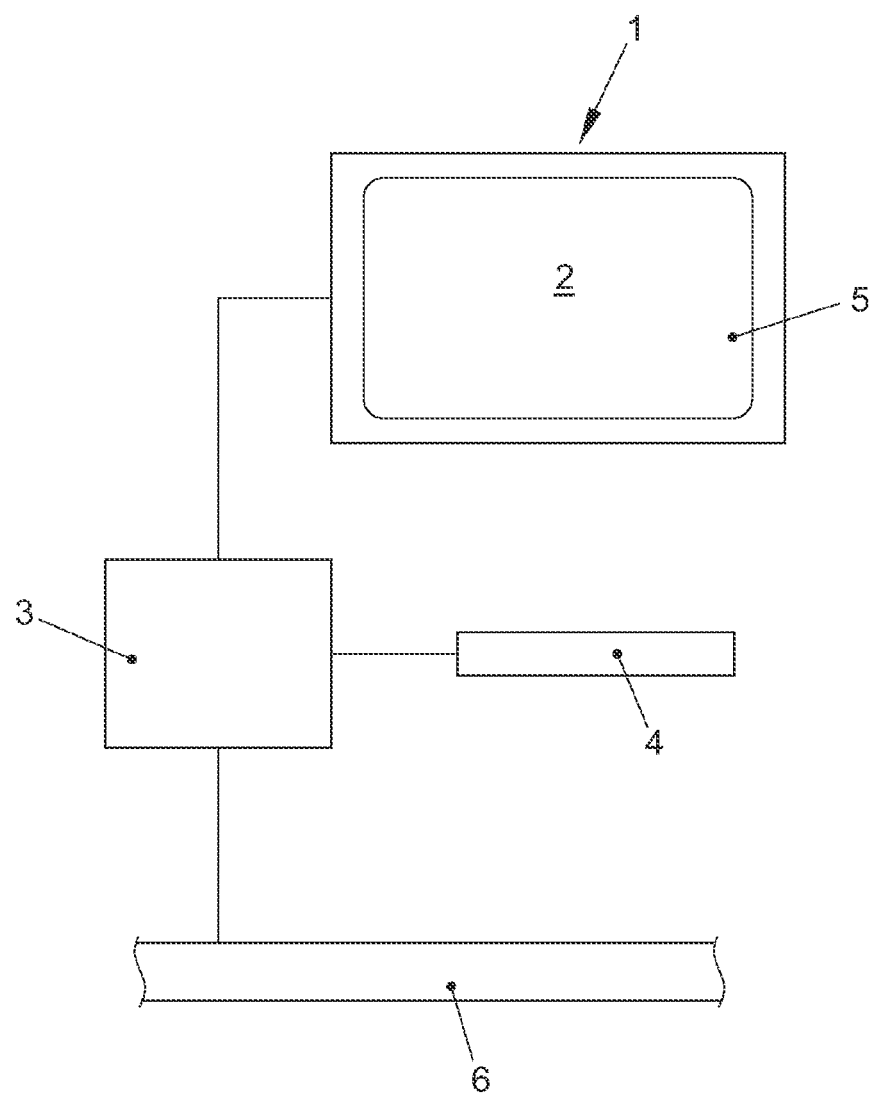
FIG. 1 schematically illustrates the construction of a device for performing the method according to an example embodiment of the present invention and the coupling of this device to other devices of the vehicle.

With reference to FIG. 1, a device is first described, using which the method according to an example embodiment of the present invention may be performed. The device is accommodated in a vehicle, in particular in a motor vehicle, and there is able to display information to the occupants of the vehicle and to support the operation of devices of the vehicle.

The device includes a display device 1 having a display area 2, which is situated in the interior of the vehicle in such a way that it is highly visible by at least one vehicle occupant, in particular the driver. Display area 2 may be provided by a display, in particular a liquid crystal display, of any type of construction. The display device is coupled with a control unit 3.

Control unit 3 generates graphic data that may be displayed by display device 1. For this purpose, control unit 3 is connected to a memory 4 for storing data. The data are displayed graphically on the basis of objects. The objects are structured hierarchically, as will be explained in more detail below.

Control unit 3 may be further connected to devices of the vehicle via a vehicle bus 6. Control unit 3 may be coupled to a navigation system or a music system for example. In order to control these devices, control unit 3 is coupled to an operating device. The operating device may be a touch-sensitive surface 5 of display area 2 for example. Display device 1 in this case therefore includes a so-called touch screen. The operating device could also be provided differently however. For example, a mechanical operating element may be provided that is separate from display area 2.

The information display on display area 2 generated by control unit 3 may support in particular an operating process performed with the aid of the operating device. For this purpose, control unit 3 displays buttons that may be selected using the operating device. A button may be selected by touching touch-sensitive surface 5 of display area 2. If the operating device is arranged as a separate operating element, then the selection may be made by cursor control in combination with a selection key. The selection of a button is detected by control unit 3, whereupon control unit 3 performs a function associated with the button. This function may on the one hand relate to controlling a device of a vehicle such as e.g. the transfer of a specific destination into the navigation system or the playback of a specific piece of music. On the other hand, the selection of a button may cause a change in the display of information.

With reference to FIGS. 2 through 11, the following will explain how control unit 3 controls the display of information on display area 2. The chosen example is the navigation in a music database that is stored in memory 4. Corresponding information displays, however, may also be generated for any other hierarchically structured objects using the method described herein.

The pieces of music of the music database are divided into different categories, e.g., in a conventional manner. A piece of music belongs to a specific album of a specific artist for example. The piece of music may furthermore be associated with a specific genre and a specific playlist. The individual categories are hierarchically structured with respect to one another. Various artists are associated with one genre for example. Various albums are in turn associated with the artists, the albums in turn including various pieces of music.

Figure 2:
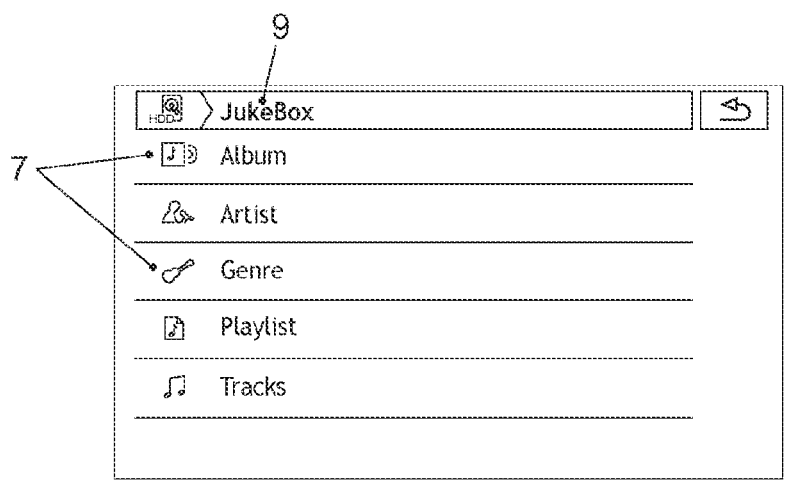
FIGS. 2 through 11 show information displays on a display area, which are produced by the method according to an example embodiment of the present invention.

FIG. 2 shows the information display of the main menu for the music database. Display element 9 indicates that one has accessed the music database. In addition, objects 7 ("Album," "Artist," "Genre," "Playlist," "Tracks") are displayed as selectable buttons. By selecting objects 7, the user is able to access a desired piece of music via different paths. If the user selects for example the button of object 7 "Genre," then he will arrive at the information display shown in FIG. 3.

Figure 3:
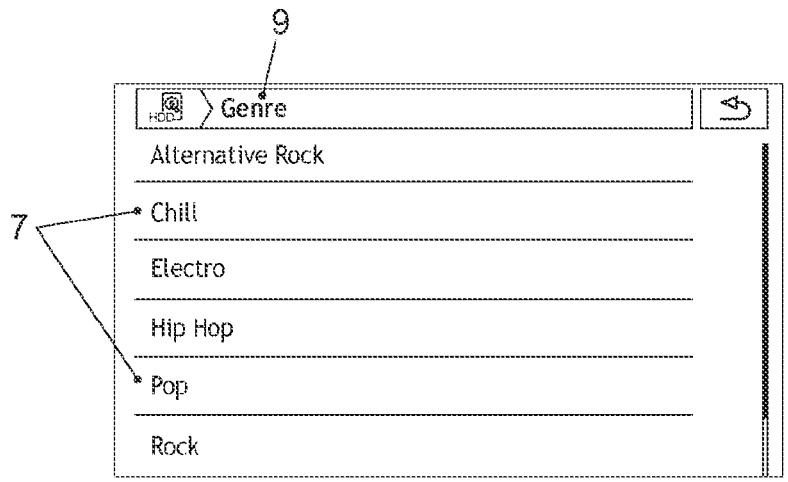

The information display in FIG. 3 indicates the objects 7 belonging to the "Genre" object of the next lower hierarchy level. In this case, objects 7 are again selectable buttons. Display element 9 now indicates that objects 7 belong to the higher-order "Genre" object. If the user now selects the object 7 "Pop," then he will arrive at the information display shown in FIG. 4.

Figure 4:
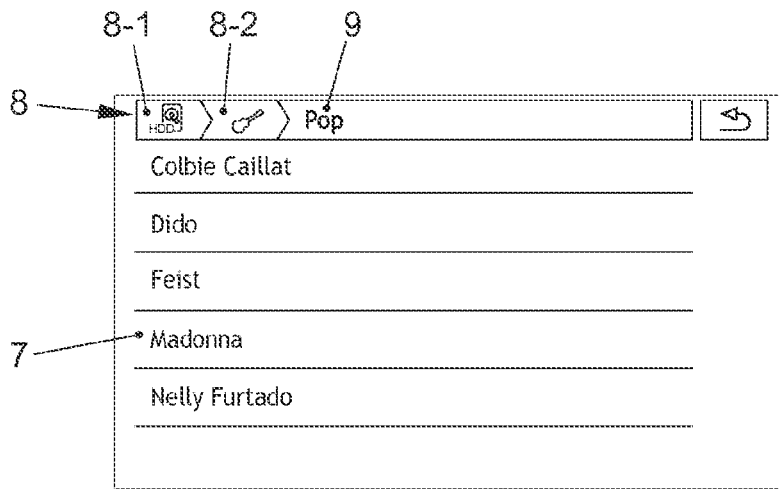

FIG. 4 shows the information display for the next lower hierarchy level. Objects 7 are again displayed as selectable buttons. In this case, objects 7 refer to the artists associated with the "Pop" genre. This higher-order "Pop" object is shown in display element 9. Next to display element 9 is a bar that represents path 8, via which the user has arrived at the information display shown in FIG. 4. Path 8 is divided into individual path elements 8-1 and 8-2. Path elements 8-1, 8-2 belong to different hierarchy levels of path 8 that leads to displayed object 7 or displayed objects 7. Path element 8-1 refers to the highest hierarchy level, that is, the music database. The reference to the music database is established via a symbol that is represented within path element 8-1. Second path element 8-2 refers to the next lower hierarchy level, that is, the "Genre." This hierarchy level is also represented visually by a symbol within path element 8-2. In the method described herein, path elements 8-1, 8-2 are distinguished by the fact that they are provided as selectable buttons. When selecting a path element 8-1, 8-2, the information display jumps to the hierarchy level associated with selected path element 8-1, 8-2, as will be explained later.

Figure 5:
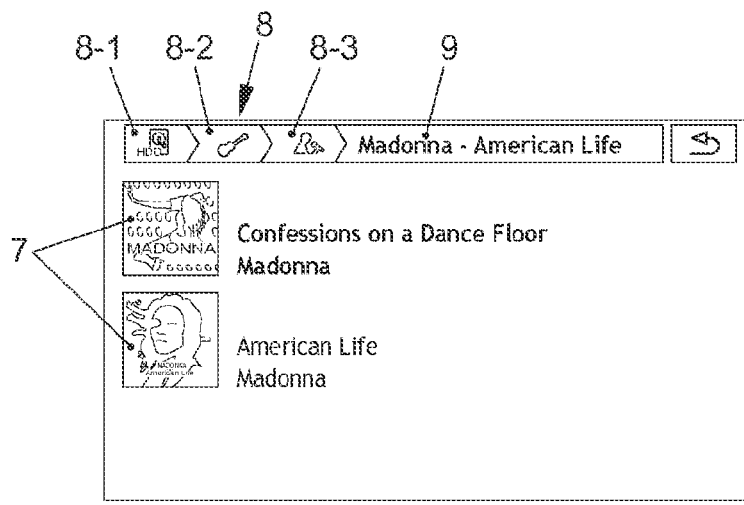

If starting from the information display as shown in FIG. 4, the user selects the object 7 "Madonna," he will obtain the information display shown in FIG. 5. In this case, the albums of the artist "Madonna" stored in memory 4 are displayed as objects 7 of the next lower hierarchy level. Furthermore, path element 8-3 is added to path 8 in the bar, which is associated with the hierarchy level of the selected object 7 "Artist." Display element 9 furthermore displays a specific album of the artist "Madonna."

The bar now indicates as path 8 the history of how the user arrived at the albums of the artist "Madonna," that is, starting from the music database, which is represented by path element 8-1, via the genre, which is represented by path element 8-2, to the selection of the artist, who is represented by path element 8-3. By selecting one of path elements 8-1 through 8-3, the user is able to jump to a hierarchy level associated with the respective path element 8-1 through 8-3.

Figure 6:
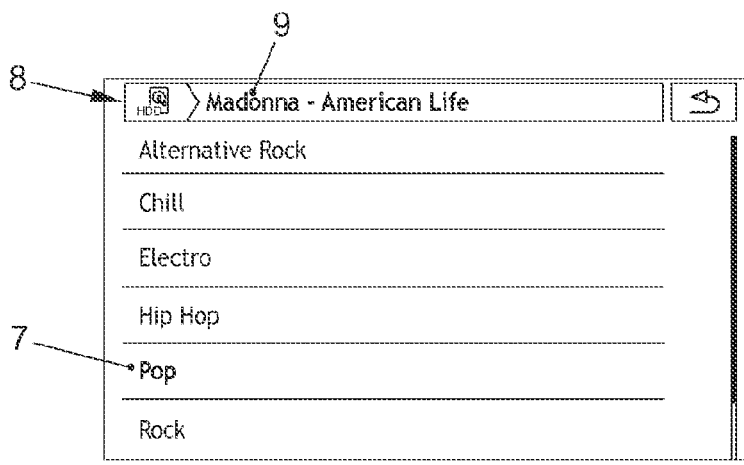

If the user selects path element 8-2 for example, he is returned to the hierarchy level of the "Genre" object, as shown in FIG. 6. One should note that object 7 "Pop" is displayed as emphasized, i.e., marked, with respect to the other objects. This indicates that this object 7 was selected most recently. Furthermore, display element 9 no longer shows the higher-order object, as in the information display shown in FIG. 3, but rather shows the last marking of the last information display of a lower hierarchy level, namely a specific album of the artist Madonna in path 8 shown in FIG. 6.

Figure 7:
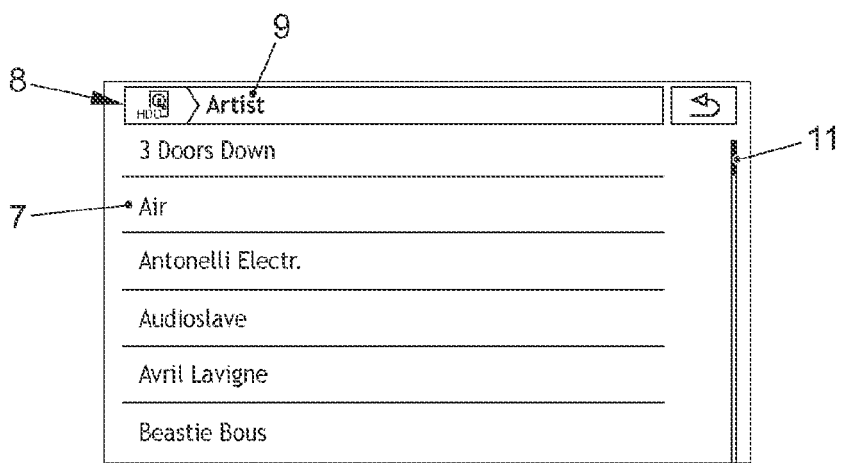

Starting from the information display, as shown in FIG. 2, it is also possible to reach a specific album or piece of music of an artist via another path 8. Starting from the information display of FIG. 2, it is possible for example to select object 7 "Artist." Subsequently, one obtains the information display as represented in FIG. 7. Display element 9 indicates the last selection of object 7 "Artist." The various artists are shown as object 7 of the next lower hierarchy level. Since the list of artists cannot be displayed in its entirety on display area 2, a subset of the total list is displayed. The operating device may be used to scroll within the list. A display element representing a bar 11 indicates where one is situated within the list.

Figure 8:
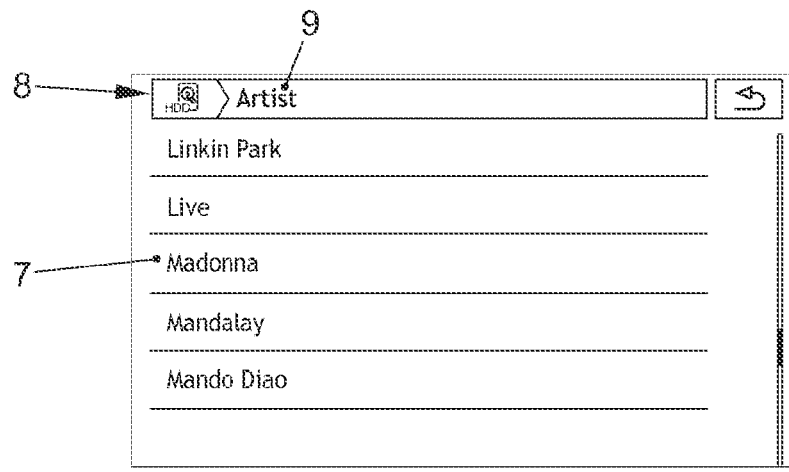
Figure 9:
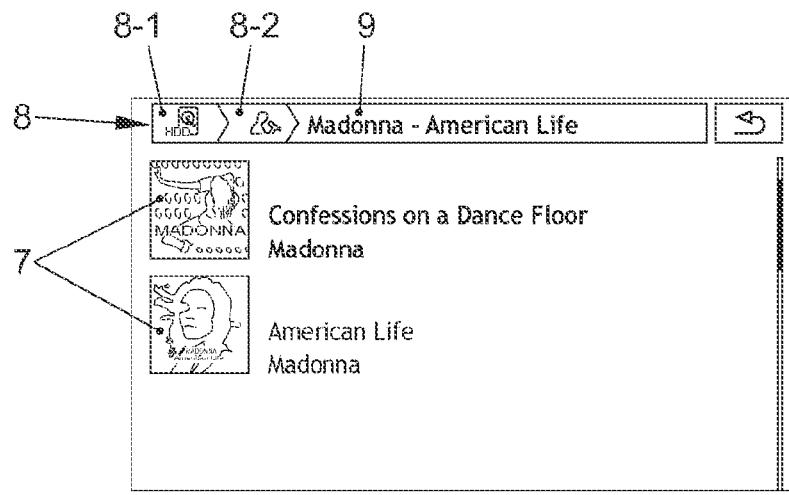
Figure 10:
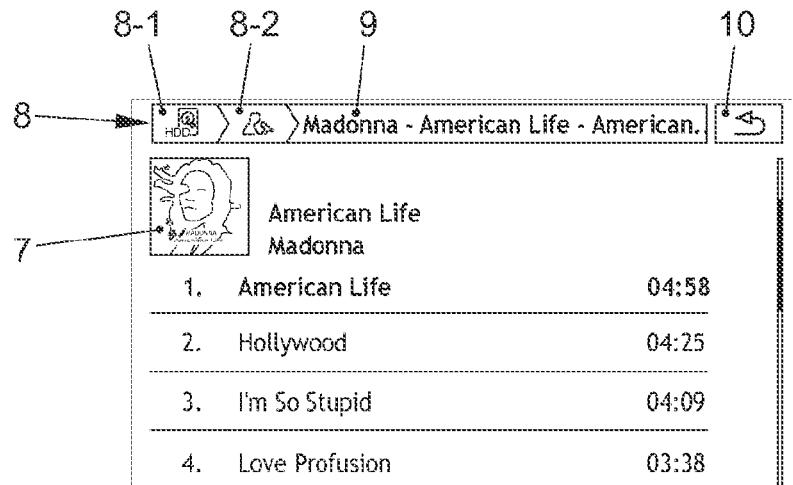
Figure 11:
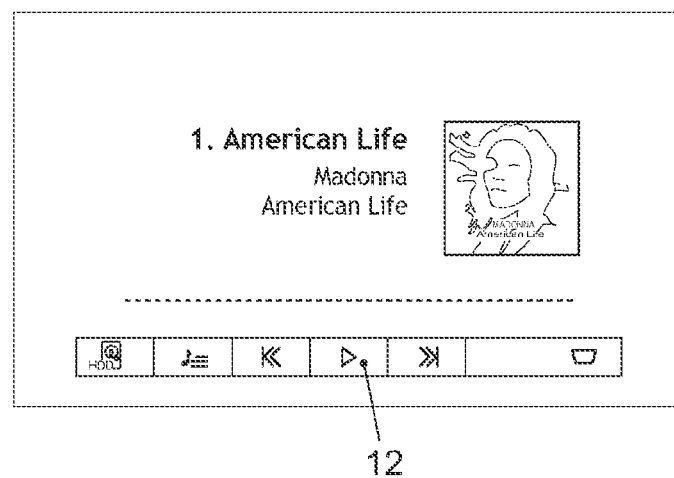

The user is thus able to scroll down until the information display represented in FIG. 8 is shown, in which object 7 for the artist "Madonna" is displayed. If the user selects this object 7, he obtains the information display shown in FIG. 9. As in the information display shown in FIG. 5, the two albums of the artist "Madonna" stored in memory 4 are displayed as objects 7. However, since in this case the user arrived at this information display via another path 8, other path elements 8-1 and 8-2 are also displayed, namely, path element 8-1 for the music database and path element 8-2 for the hierarchy level of the "Artist" object. By selecting one of path elements 8-1 or 8-2, the user is able to return to previous information displays. The user may furthermore select an object 7, e.g. the album "American Life." In this case, the display of object 7 is maintained. Under object 7, however, the individual songs of this album are displayed as selectable buttons. A marked song is furthermore included in display element 9. In addition, a button 10 is displayed. If the user selects button 10, he obtains the information display shown in FIG. 11. In this information display, a button 12 is shown, by which the user is able to control the music system of the vehicle such that the selected song is played.

LIST OF REFERENCE NUMERALS

1 Display device
2 Display area
3 Control unit
4 Memory
5 Touch-sensitive surface
6 Vehicle bus
7 Objects
8 Path
8-1, 8-2, 8-3 Path elements
9 Display element
10 Button
11 Bar
12 Button

What is claimed is:

1. A method for controlling display of information on a display surface, the information being structured hierarchically in objects, comprising:
    displaying an object and a path that leads to the object in the hierarchical structure;
    dividing the path into individual path elements, the path elements belonging to different hierarchy levels of the path leading to the object, and the path elements being selectable buttons; and
    when a path element is selected, changing the information display to the hierarchy level of the selected path element;
    wherein graphic symbols are respectively displayed in the path elements for visualizing the hierarchy level of the path element.

2. The method according to claim 1, further comprising after the selection of an object, displaying at least one subset of the objects of a next lower hierarchy level associated with the selected object, and adding a path element to the displayed path, which is associated with the hierarchy level of the selected object.

3. The method according to claim 1, wherein a number of displayed path elements, which are displayed with the displayed object, depends on a number of steps, via which one arrived at the object.

4. The method according to claim 3, wherein individual path elements are displayed side-by-side on a bar.

5. The method according to claim 1, wherein a number of displayed path elements depends on a depth of the hierarchy level of the displayed object.

6. The method according to claim 5, wherein individual path elements are displayed side-by-side on a bar.

7. The method according to claim 1, further comprising following a selection of a path element, displaying at least a subset of the objects at the hierarchy level, which are associated with the selected path element.

8. The method according to claim 1, further comprising:
    displaying a subset with objects of an xth hierarchy level;
    subsequently, selecting a first object of the xth hierarchy level;
    subsequently, displaying at least one subset of objects of a next lower, (x+1)th hierarchy level, the displayed objects being associated with the selected first object and adding an nth path element to the displayed path, which is associated with the xth hierarchy level; and
    if the nth path element is selected, displaying the subset with objects of the xth hierarchy level, the first, previously selected object being displayed as marked.

9. The method according to claim 1, wherein individual path elements are displayed side-by-side on a bar.

\* \* \* \* \*